United States Patent [19]

Smith, Jr.

[11] 4,009,082
[45] Feb. 22, 1977

[54] PRODUCTION OF ENERGY BY DIRECT CONTACT OF WATER IMMISCIBLE WORKING FLUID WITH HOT OR WARM WATER TO VAPORIZE LIQUID WORKING FLUID, UTILIZATION OF VAPOR TO PRODUCE MECHANICAL ENERGY AND DIRECT CONTACT OF SPENT VAPOR WITH COLD OR COOL WATER TO CONDENSE SAME

[76] Inventor: Calvin Schwartz Smith, Jr., 8529 Betty Lane, El Cerrito, Calif. 94530

[22] Filed: Dec. 1, 1975

[21] Appl. No.: 636,417

Related U.S. Application Data

[63] Continuation-in-part of Ser. Nos. 480,963, June 19, 1974, and Ser. No. 224,018, Feb. 7, 1972, Pat. No. 3,856,631, and Ser. No. 19,592, March 16, 1970, Pat. No. 3,640,850.

[52] U.S. Cl. .................... 203/11; 159/DIG. 33; 203/39; 203/42; 203/74; 203/91; 203/100; 203/DIG. 20; 202/234
[51] Int. Cl.² ................. B01D 3/00; B01D 3/34
[58] Field of Search ............ 159/DIG. 17, DIG. 33; 203/39, 42, 74, 91, 100, DIG. 20, DIG. 17; 202/234

[56] References Cited
UNITED STATES PATENTS

| 2,006,985 | 7/1935 | Claude et al. | 203/DIG. 17 |
|---|---|---|---|
| 2,749,094 | 6/1956 | Lewis et al. | 159/DIG. 17 |
| 3,232,847 | 2/1966 | Hoff | 159/DIG. 17 |
| 3,337,421 | 8/1967 | El Roy | 159/DIG. 17 |
| 3,410,339 | 11/1968 | Wiegardt | 159/DIG. 17 |
| 3,627,646 | 12/1971 | Osdor | 159/DIG. 17 |
| 3,640,631 | 2/1972 | Smith, Jr. | 159/DIG. 17 |
| 3,734,160 | 5/1973 | Osdor | 159/DIG. 17 |
| 3,741,878 | 6/1973 | Osdor | 159/DIG. 17 |
| 3,855,079 | 12/1974 | Greenfield | 159/DIG. 17 |
| 3,856,631 | 12/1974 | Smith, Jr. | 159/DIG. 17 |

OTHER PUBLICATIONS

Acobor (Association pour l'Organization de Collogues Occanologiques a Bordeaux) b.p. 315–316, 75767 Paris Cedex 16–France vol. 2.

Primary Examiner—Jack Sofer
Attorney, Agent, or Firm—Edward B. Gregg

[57] ABSTRACT

A low boiling water immiscible fluid containing two or more molecular species and having a variable boiling point is contacted in the liquid state with relatively hot or warm water such as surface sea water or geothermal water, thereby generating vapor of immiscible fluid (together with a certain amount of water vapor) which is used to drive a prime mover such as a gas turbine and thereby produce mechanical energy; the exhaust vapor from the prime mover is condensed by direct contact with a relatively cool or cold liquid aqueous phase such as deep sea water or water from a lake or stream or cooling tower to condense the vapor; and the condensate is recycled. Provision is made for ridding water discharged from the system of entrained and dissolved immiscible fluid. By countercurrent flow of the liquid phases and by suitable matching techniques greater efficiency is obtained. The invention is also applicable to heat pumps.

25 Claims, 13 Drawing Figures

Fig 1
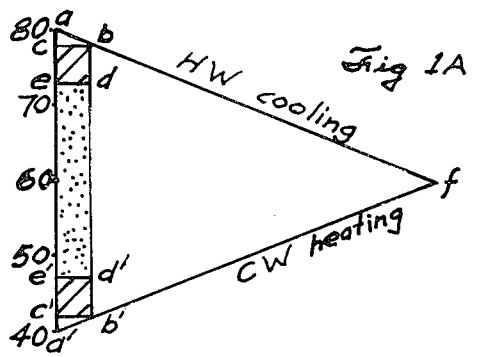
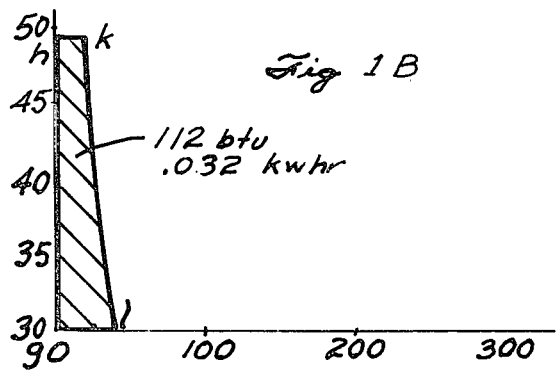
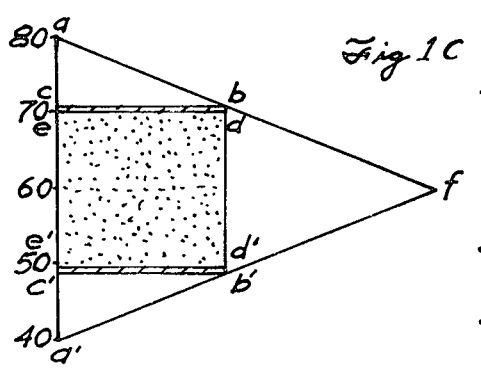
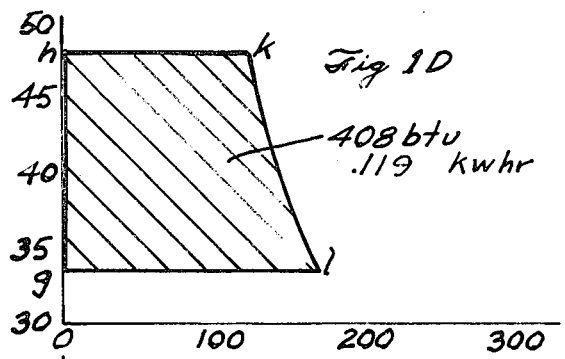
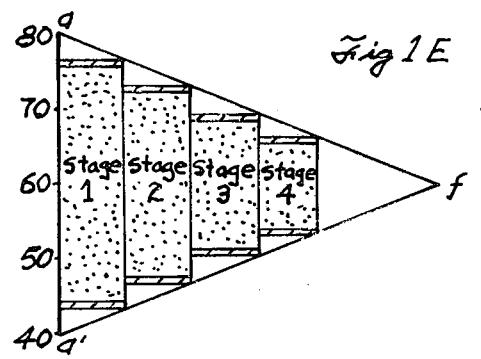
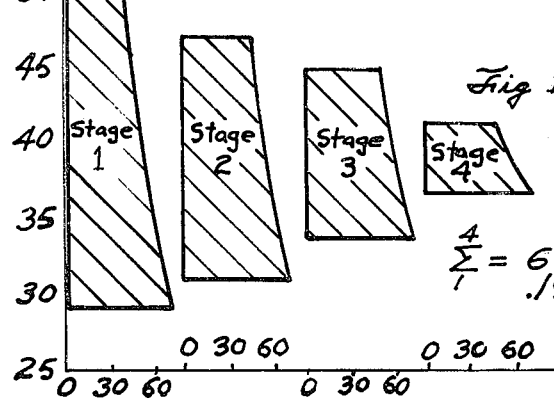
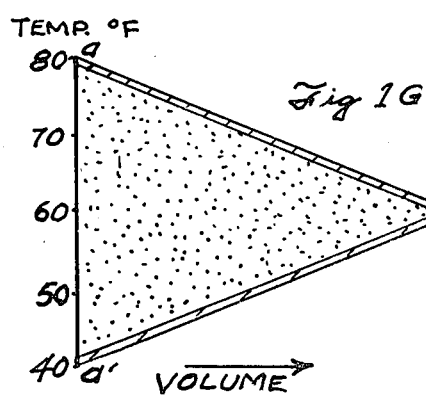
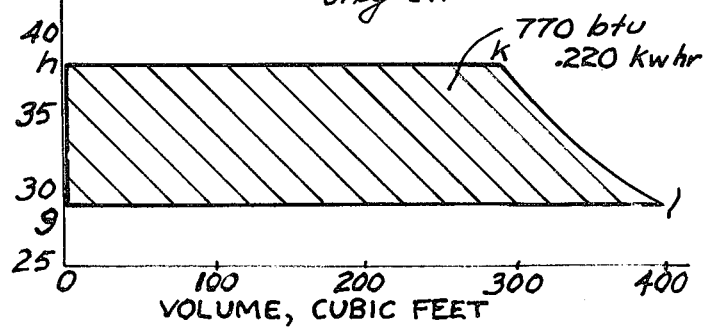

the water to the liquid working fluid thereby causing the liquid working fluid to vaporize. The resulting vapor, which consists mostly of vapor of working fluid but also contains a certain amount of water vapor, is passed through a combustionless gas pressure-to-mechanical energy converter such as a gas turbine or a reciprocating piston engine; the mechanical energy produced by the prime mover is utilized, for example to operate an electric generator and/or to operate a pump; the exhaust vapor from the energy convertor is brough into direct contact with and is caused (along with its condensate) to flow countercurrently to and in intimate direct contact with a flowing stream of cool or cold water thereby condensing the vapor to liquid working fluid; and the resulting condensate is recycled to the vaporization part of the process.

PRODUCTION OF ENERGY BY DIRECT CONTACT OF WATER IMMISCIBLE WORKING FLUID WITH HOT OR WARM WATER TO VAPORIZE LIQUID WORKING FLUID, UTILIZATION OF VAPOR TO PRODUCE MECHANICAL ENERGY AND DIRECT CONTACT OF SPENT VAPOR WITH COLD OR COOL WATER TO CONDENSE SAME

This application is a continuation-in-part of my co-pending application, Ser. No. 480,963 filed June 19, 1974 entitled "Direct Contact of Low Boiling Water Immiscible Medium with Hot and Cold Bodies of Water to Transfer Heat for Purposes of Energy Production and/or Desalination"; of my application Ser. No. 224,018 filed Feb. 7, 1972 and now U.S. Pat. No. 3,856,631 entitled "Process and Apparatus for Separating Water from Non-Volatile Solutes"; and of my application, Ser. No. 19,592 filed Mar. 16, 1970, entitled "Process for Producing Fresh Water from Salt Water", now U.S. Pat. No. 3,640,850.

This invention relates to the production of mechanical energy from the thermal energy present in a source of warm or hot water which is in proximity to a source of cold or cool water capable of acting as a condensing medium for spent vapor of a working fluid.

In my co-pending Application, Ser. No. 480,963 there is described and claimed a process whereby a working fluid is employed which is low boiling, which is immiscible with water and which has a density sufficiently different from water to allow separation by gravity. This working fluid while in the liquid state is vaporized by direct contact with a warm or hot body of water, for example, surface sea water at 75°, 80° or 85° F. The resulting vapor of working fluid is used to drive a combustionless gas pressure operated prime mover such as gas turbine, which in turn may be used to operate an electric generator. A nearby or readily accessible body of cold or cool water, such for example, as sea water from a 1,000 plus foot depth of the ocean (where the water temperature is about 35° to 45° F.) is used to condense the spent vapor of working fluid by direct contact between the two phases (spent vapor of working fluid and cold or cool water) and the resulting condensate (liquid working fluid) is recycled to the evaporating zone. Provision is also made for treating the cooled warm water resulting from evaporation of liquid working fluid and the warmed cold water resulting from condensation of vapor of working fluid, to rid these used liquid aqueous phases of entrained and dissolved working fluid before they are returned to the environment.

The present invention also relates to heat transfer between a working fluid and warm water for the purpose of vaporization of the working fluid, expansion of the working fluid vapor through a prime mover, and condensation of the working fluid with a second body of colder water, said working fluid being immiscible in water and low boiling. The working fluid is a mixture of low boiling compounds such that it has a variable boiling point, such fluid being moved countercurrently to the liquid aqueous phase. The invention relates particularly to the utilization of thermal energy from energy sources now considered non-economic such as the exhaust heat from thermalelectric power plants, low level heat from geothermal sources, and from the warmer surface waters of the ocean. It also provides means of treating the effluent water from such a plant to remove all but an insignificant trace of the working fluid to permit it to be returned to the environment in an acceptable state of purity. The invention will first be described with respect to the production of mechanical energy from sea water.

Surface sea water is commonly wave mixed to a depth of 100 to 200 feet, and is relatively warm. Being lighter in density it floats on the cold sea water below. This surface sea water varies in temperature from about 50° F. to about 95° F. depending upon the location and the season. For example, off the coast of lower California the mean surface water temperature during August 1969 was 71° F. and in October it was 65.4° F.; in the Gulf of Mexico off Texas and Louisiana it was 83° F. and 73.7° F. (August and October, 1969, respectively). In the Persian Gulf, it was 92.4° F. and 83.2° F. (August and October, 1969, respectively).

Below about 100 to 200 feet, the water temperature drops in what oceanographers call the thermocline. Below about 2,000 feet, the temperature of the ocean is relatively uniform throughout the world and is 35° to 40° F. except for minor land locked bodies.

In accordance with the present invention, a working fluid is provided which is lower boiling than water, which is immiscible with water, which has a density sufficiently different from that of water (preferably less than the density of water) to enable it to be separated by gravity and which contains two or more molecular species and by reason of its molecular composition has a boiling range rather than a specific boiling point. This fluid in liquid phase is caused to flow countercurrently to and in intimate direct contact with a flowing body of warm or hot water, with resulting transfer of heat from Suitable working fluids are as follows:

Propane, normal and iso-butanes, straight chain and branched chain pentanes; non-hydrocarbon species such as tetrafluoromethane, monochloro-trifluoromethane, dichloro-difluoromethane; mixtures of any two or more of the above hydrocarbon and/or fluorocarbon substances, including specially prepared blends and commonly available mixtures such as gasoline. Carbon dioxide, although rather volatile, may be used in admixtures with one or more of the above. In accordance with the preferred embodiment of the invention as described with reference to FIGS. 2 and 3, the working fluid is a mixture of two or more molecular species such that the working fluid has a boiling range rather than a boiling point, but in, for example, the application of the principle of direct intimate contact of working fluid and water to heat pumps as illustrated in FIG. 5, a single molecular species may be employed.

Certain terms used herein are identified by symbols as follows:

FW signifies fresh water in the liquid phase.
WV signifies water vapor.
CW signifies relatively cold water in the liquid phase, including fresh or saline water.
HW signifies relatively warm or hot water in the liquid phase, including fresh or saline water, sea water or other water.
SW signifies sea water or other saline water.
HSW signifies relatively warm sea water or other saline water, e.g. surface sea water as contrasted with deep sea water.
CSW signifies relatively cold sea water or other saline water, e.g. sea water from a depth of 1,000 feet, temperature = 35° C.
CFW signifies cold fresh water in the liquid phase.
HFW signifies relatively warm or hot fresh water in the liquid phase.
UW signifies water in the liquid phase that has been used in the process of the invention and which has not yet been treated to removed dissolved and entrained working fluid.
TW signifies water in the liquid phase that has been used in the process of the invention and which has been treated to remove dissolved and entrained working fluid.
USW and TSW signify treated UW and TW, respectively, where the water is sea water or other saline water.
WF signifies working fluid, whether relatively hot or cold and whether in the vapor phase or the liquid phase. The working fluid (WF) has the properties described above.
VWF signifies working fluid in the vapor phase.
LWF signifies working fluid in the liquid phase.
NCG signifies non-condensible gases such as air.

The accompanying drawings illustrate advantages of the present invention (FIG. 1) and certain embodiments of the invention (FIGS. 2 to 5).

In the drawings,

FIG. 1 consists of a series of diagrams designated in pairs as FIGS. 1A and 1B, FIGS. 1C and 1D, FIGS. 1E and 1F and FIGS. 1G and 1H. FIG. 1 taken as a whole compares the thermodynamics of prior systems using out of contact heat transfer to a working fluid (WF), direct contact heat transfer to a working fluid, the effects of staging and the advantages of the present invention employing direct contact with a multimolecular species working fluid flowing countercurrently to the liquid aqueous phases.

Figure 2:
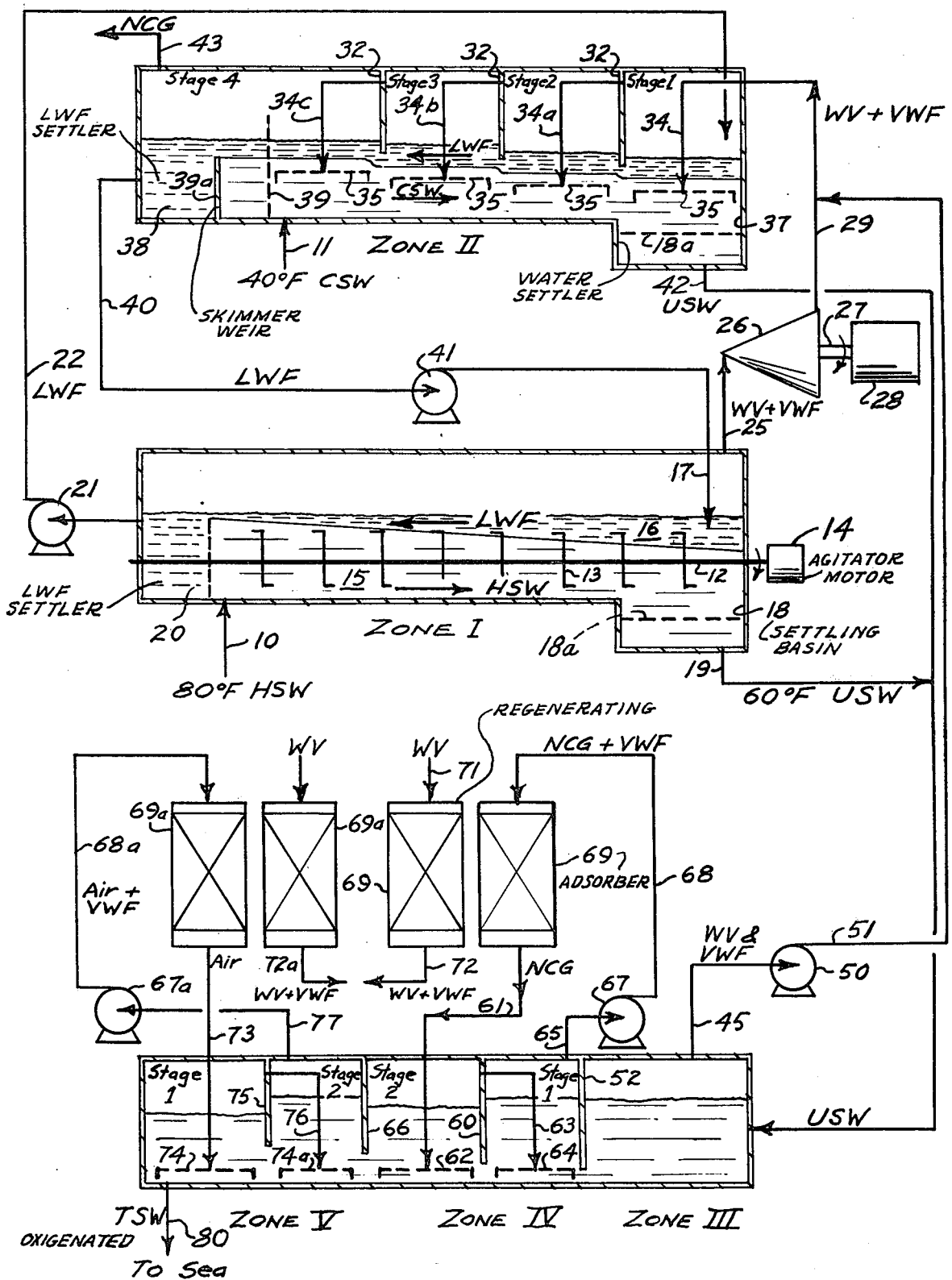
FIG. 2 is a diagrammatic view of a system employing, by way of example, warm surface sea water (HSW) at 80° F. as the heat source, cold deep sea water (CSW) at 40° F. as the cold water source and a mixture of isobutane and normal butane as the working fluid (WF).

Composite FIG. 1A – 1H will now be described.

FIG. 1A is a temperature vs. volume diagram in which the line $af$ represents the cooling curve of warm water (HW) and the line $a'f$ represents the warming curve of cold water (CW). The area $afa'$ represents roughly the theoretical horsepower that can be obtained by vaporizing a liquid working fluid (LWF) by heat transfer from the warm water (HW) expanding the vapor through a gas turbine, and condensation of the expanded vapor (VWF) by the cold water, neglecting turbine inefficiency and generator inefficiency.

FIG. 1B is the corresponding Rankine cycle diagram plotting pressure against volume (psia and cubic feet).

FIGS. 1C and 1D; 1E and 1F; and 1G and 1H are similar pairs. Throughout 1,000 pounds of warm water (HW) at 80° F. and 1,000 pounds of cold water (CW) at 40° F., with cooling of the warm water to 60° F. and warming of cold water to 60° F. are assumed.

FIGS. 1A and 1B are for a system in which isobutane (normal boiling point = 14° F.) is the working fluid and heat transfer is out-of-contact heat transfer, the so-called Anderson process, which is currently regarded by authoritative sources as the most practical method of heat transfer from sources such as warm surface sea water.

The systems of FIGS. 1C to 1H will be described below.

Referring now to FIG. 1A, several losses of theoretical power are suffered in this process. These losses are indicated by the areas identified below. One such heat loss is the loss due to the fact that the warm water (HW) is cooled to a lower temperature which typically in such a process is 78° F. and the cool water (CW) is heated to 42° F. These are stage losses represented by the areas $abc$ and $a'b'c'$, respectively. Another element of power loss results from the temperature drop ΔT required to drive heat from the warm water (HW) through the heat exchange barrier into the liquid isobutane (LWF) in the evaporating part of the cycle and to drive heat from the vapor of working fluid (VWF) into the cool water (CW) in the condensing part of the cycle. These losses are represented by the areas $cbde$ and $c'b'd'e'$. By far the largest element of heat loss is what may be described as the end loss, which results from the fact that warm water (HW) is discarded at 78° F. and cool water (CW) is discarded at 42° F. rather than at 60° F., which is the midpoint between 80° F. and 40° F. The end loss is represented by the large area $bfb'$. The net result is that the recovery of theoretical power is that represented by the area $edd'e'$.

In the illustration just described, the designer could of course cool the warm water to less than 78° F. and heat the cool water to more than 42° F. thereby diminishing the end loss (although increasing the stage loss), and he could reduce the stage loss by using multiple stages. However, with an out-of-contact heat transfer system such choices are greatly limited by the high cost of heat exchange equipment and by the temperature drop (ΔT) inherently required to operate an out-of-contact heat transfer process. The example given is consistent with the present day engineering optima.

FIG. 1B is a Rankine cycle diagram plotting pressure (psia) against volume (cubic feet). The area $ghkl$ represents the theoretical work that can be obtained from the system described with reference to FIG. 1A; that is the work that would be done by a gas pressure-to-energy converter such as a gas turbine that is 100% efficient. As will be seen, the theoretical work obtained is 112 BTU or 0.032 KWH (kilowatt-hour). About 35% of the recovered power will be required for pumping.

FIGS. 1C and 1D are similar diagrams but for a direct contact system such as described in our copending application, Ser. No. 480,963. 1,000 pounds of water at 80° F. is the heat source; isobutane is the working fluid; and 1,000 pounds of cooling water at 40° F. is the cooling fluid. However, in this case the liquid isobutane is contacted directly with the warm water to vaporize it and isobutane vapor (plus water vapor) is contacted directly with the cool water to condense it. Staging losses, heat transfer losses and end losses are as shown (letters identical to those in FIG. 1A identify the respective areas). In this instance, it is feasible, because of the much smaller heat transfer loss, to cool the warm water from 80° to 70° F. and to heat the cooling water from 40° to 50° F. This is possible, in part at least, because most of the heat transfer losses (those encountered being the areas cbde and $c'b'd'e'$) are eliminated. FIG. 1D (the PV or Rankine diagram) shows the theoretical energy recovery as 408 BTU or 0.119 KWH.

FIG. 1E is a diagram for the same system (1,000 pounds of warm sea water at 80° F., 1,000 pounds of cool sea water at 40° F., isobutane as working fluid) as in FIGS. 1A and 1C and using direct contact as in FIG. 1C but employing four stages with cooling of warm water and heating of cool water in stages as shown. Stage losses and end loss are considerably reduced and are reflected in the PV or Rankine diagram of FIG. 1F. Energy recovery is 647 BTU or 0.19 KWH.

FIGS. 1G and 1H represent the same system using 1,000 pounds each of 80° F. warm water and 40° F. cool water but, instead of isobutane, using a mixture of hydrocarbons (propane, butanes and pentanes) having an initial boiling point of 14° F. and an end boiling point of 34° F. (Throughout, where a boiling point is given the boiling point is at atmospheric pressure unless otherwise indicated.) The system also employs countercurrent flow of the fluids, i.e., the liquid working fluid flows countercurrently to the warm water and the spent vapor of working fluid and condensate thereof flow countercurrently to the cool water. Contact is direct. As will be seen, the theoretical work obtained is 770 BTU or 0.22 KWH.

The diagrams of FIGS. 1A through 1H are not to be taken as quantitatively accurate but they accurately reflect the major differences of the various methods of heat transfer and represent the order of magnitude of improvements in energy recovery.

Referring now to FIG. 2, two Zones, Zone I and Zone II, are shown for, respectively, evaporating liquid working fluid (LWF) by direct contact with the source of thermal energy [in this case warm sea water (HSW) at 80° F. entering through line 10] and for condensing vapor of working fluid (VWF) by direct contact wth cold sea water (CSW) at 40° F. entering through line 11.

Zone I is shown equipped with a mechanical agitator having a shaft 12 with spaced paddles 13 and driven by a motor 14. By this means, the two phases, namely, the warm aqueous phase shown at 15 as a lower layer and the liquid working fluid shown at 16 as an upper layer, are caused to undergo intimate direct contact. However, as will be apparent from the description below, other agitating means may be used and indeed a suitable form of agitation is provided by the boiling of liquid working fluid aided, if need be, by admitting a small portion of liquid working fluid or vapor of working fluid into the bottom of Zone I, thus causing bubbles of vapor of working fluid to ascend through the warm aqueous liquid 15 and causing agitation and direct contact between the liquid phases.

Liquid working fluid is continuously introduced into one end (the right hand end as viewed in FIG. 2) of Zone I through line 17. The agitation of the two bodies of liquid in Zone I is not such as to churn them into a homogeneous mass such as an emulsion. Under such conditions, the liquid working fluid 16 will flow to the left as indicated by the upper arrow and by the time it reaches the far (left hand) end of Zone I it will have been almost completely evaporated. Warm water 15 introduced continuously through line 10 will move to the right and it will flow into a settling basin 18 wherein all but a small quantity of entrained and dissolved working fluid are separated from the now cooled aqueous liquid (USW), which is removed through line 19 for processing as described hereinafter. A perforated baffle 18a serves to separate the settling area from the agitated area.

Any small residuum of liquid working fluid at the left hand end of Zone I is settled in settling zone 20 and is drawn off by pump 21 and is pumped through line 22 to Zone II, such flow being sufficient only to maintain a general flow of the liquid working fluid from right to left. The immiscible working fluid extracts from the sea water (after many cycles) minute amounts of hydrocarbons such as natural fats and waxes which increase the boiling end point after most of the working fluid has been vaporized. It is usually advantageous for control, efficiency, and heat transfer reasons to operate with a layer of liquid working fluid in all parts of Zone I. This is possible if the boiling end point of the working fluid is slightly higher (at the prevailing pressure) than the temperature of the incoming warm water. Vapor of working fluid passes out through line 25 to a prime mover 26. Prime mover 26 may be a gas turbine, or a reciprocating piston engine or any other combustion gas pressure-to-mechanical energy converter. The turbine 26 is coupled by a shaft 27 to an electric generator 28 from which electrical energy is derived. The spent vapor of working fluid leaves the prime mover 26 through line 29 to Zone II. If desired, the prime mover may do useful work in other ways, e.g. to operate pumps.

Referring now to Zone II, this zone is divided into stages by baffles 32. The baffles extend into the working fluid to provide a seal against flow of gas but still to allow liquid working fluid to flow from right to left from one stage to the next, and to allow water to flow from left to right from one stage to the next. Four stages are shown but a greater or lesser number may be employed. Line 29 terminates in a downwardly directed pipe 34, which connects to a liquid-vapor contact device 35, which may be any of various known types such as spargers or sieve plates which promote intimate contact of a vapor with a liquid. Cold sea water (CSW) from a depth of about 1,000 feet or more and having a temperature of 40° F. enters Zone II at stage 4 through line 11. As in the case of Zone I, direct intimate contact is provided between the three phases [in this case vapor of the working fluid (VWF), liquid working fluid (LWF) and cold sea water (CSW)] and the mixing is controlled to avoid emulsions. Therefore the upper layer of condensate (liquid working fluid) flows from right to left and sea water flows from left to right. An increment of vapor of working fluid is condensed in each stage and flows to the left. A settling basin is provided at 37 to separate the used sea water from all but a small amount of entrained and dissolved working fluid. Liquid working fluid is settled in settling area 38 separated by perforated baffle 39 from the agitated liquid, skimmed by weir 39a and drawn off through line 40 and is pumped by pump 41 through line 17 for recycling to Zone I. Used sea water (USW) is removed through line 42.

The vapor of working fluid entering stage 1 of Zone II through pipe 34 is partially condensed, with the highest boiling point material condensing first. This is essentially the same fraction of the working fluid vaporized in the hottest section of Zone I, and including the liquid working fluid added through line 22 it has about the same composition as the material vaporizing at the left hand end of Zone I. Uncondensed vapor of working fluid is passed by line 34a to contact device 35 in stage 2. In stage 2, the vapor of working fluid is contacted with cooler water than that in stage 1 and more condensation occurs. The uncondensed vapor flows from stage 2 to stage 3 via line 34b and is contacted with still cooler water by contact device 35 and additional condensation occur. The mixing in each stage is aided by the passage of vapor through the liquid phase and for that reason it is preferred to introduce the vapor of working fluid below the upper level of the water layer. In stage 4, essentially total condensation occurs. Therefore, mixing caused by flow of vapor through the liquid phases is less and it may be desired to aid the mixing. This may be done in a manner which will be described shortly. Uncondensed gas, largely air and other noncondensables dissolved in sea water is removed through line 43. A portion of that gas may be compressed and returned to stage 4 to aid in mixing the liquid and vapor phases.

Used sea water (USW) drawn off through lines 19 and 42 passes to a flashing Zone III wherein the pressure is lowered, for example to atmospheric. This results in flashing of virtually all of the entrained working fluid as well as some of the dissolved working fluid. The resulting vapor of working fluid mixed with water vapor is removed through line 45 and is pumped by pump 50 to line 51 and joins spent vapor of working fluid from turbine 26 in line 29. The partially treated sea water then passes under baffle 52 to a second treating Zone (Zone IV).

Zone IV is shown as having two stages separated by a baffle 60. Zone IV may have only one stage or it may have more than two stages. Air, or if it is desired for safety purposes to avoid the possibility of explosion an inert gas such as nitrogen or oxygen-depleted air, is introduced into stage 2 of Zone IV through line 61 and is caused to mix intimately with the sea water by a sparger 62 and it is then conducted into stage 1 of Zone IV by a line 63 and a sparger 64 and passes out of Zone IV through line 65. Meanwhile, sea water passes countercurrently to the stripping gas from stage 1 to stage 2 and then underneath the baffle 66 out of the system, or for further treatment if desired as described below. Stripping gas leaving stage 1 of Zone IV is pumped by pump 67 through line 68 to an adsorber unit 69 containing active carbon, silica gel, a molecular sieve, active alumina, active silica or other suitable adsorbent for hydrocarbons. The stripping gas, thus freed of hydrocarbon that has been stripped from the sea water is returned by line 61, to stage 2 of Zone IV. Two adsorbers 69 are shown, one of which is regenerated by means of steam and, if necessary, by electrical heating to remove hydrocarbons from the circulating gas while the other adsorber is performing the function of removing hydrocarbon. Lines 71 and 72 indicate input and venting of steam.

Inasmuch as the sea water is now not only free of significant quantities of working fluid but also of oxygen it may be re-oxygenated by passing air through it. This may be accomplished by a Zone V having, for example, two stages. Air or oxygen-enriched air enters stage 1 through a line 73 and submerged sparger 74 and passes through baffle 75 by line 76 and through submerged sparger 74a, then out of Zone V through line 77 and is pumped through an adsorber system similar to that of Zone IV and similarly numbered with the letter a added. Treated (i.e., purified and re-oxygenated) sea water is returned through line 80 to the sea, at a depth if desired having a similar temperature to avoid ecological disturbance.

It will be understood that to avoid undue buildup of impurities and contaminants in circulating fluids such as working fluid (WF) in Zones I and II and air in Zones IV and V, bleed lines may be employed and that input lines for input of working fluid and air to replace the fluid that is bled from the system and to make up for other losses will be employed.

The following examples, which are set forth in tabular form, will serve to illustrate certain aspects of the invention. In Table I, the working fluid is isobutane in Examples 1 and 2; in Examples 3 and 4, it is a mixture of low boiling hydrocarbons (for example, propane, butanes and pentanes) having the same initial boiling point as isobutane (14° F.) and an end boiling point of 34° F. In Example 5(a) the working fluid is similar to that in Example 4 but contains a high boiling fraction such that its end boiling point is 39° F. In Example 5(b) the same working fluid is employed but 20% of the liquid working fluid (LWF) fed into Zone I by line 17 is bled out through line 22 and returned to Zone II. In Example 6(a) the working fluid contains a lower boiling fraction and has a boiling range of 9° to 34° F. In Example 6(b) the same working fluid is used as in Example 6(a) but 20% is bled through line 22 as in Example 5(b).

Mixtures boiling as in Examples 3, 4, 5 and 6 can be prepared by mixing propane, butanes and pentanes in various proportions and are designed to have nearly linear boiling curves.

$T_1$ and $T_2$ are, respectively, the inlet temperature and the outlet temperature of the water in Zone I; $T_3$ and $T_4$ are, respectively, the inlet and outlet temperatures of the water in Zone II; $P_1$ is the vapor pressure in Zone 1; $P_2$ in the pressure in stage 1 of Zone II; $\Delta P$ is the difference between $P_1$ and $P_2$ and KWHr indicates the theoretical work that could be accomplished in each of the examples.

TABLE I

| | Power Generation From 1,000 lb. Warm Water and 1,000 lb. Cold $H_2O$ | | | | | | | | |
| --- | --- | --- | --- | --- | --- | --- | --- | --- | --- |
| Example | Working Fluid | $T_1$ | $T_2$ | $T_3$ | $T_4$ | $P_1$ | $P_2$ | $\Delta P$ | KWHr |
| 1 | $iC_4$ (14° F.) | 80° F | 60° F | 40° F | 60° F | 39 | 39 | 0 | 0 |

TABLE I-continued

Power Generation From 1,000 lb. Warm Water and 1,000 lb. Cold H₂O

| Example | Working Fluid | $T_1$ | $T_2$ | $T_3$ | $T_4$ | $P_1$ | $P_2$ | $\Delta P$ | KWHr |
|---|---|---|---|---|---|---|---|---|---|
| 2 | iC₄ (14° F) | 80° F | 60° F | 40° F | 50° F | 46 | 33 | 13 | .118 |
| 3 | mix (14–34° F) | 80° F | 60° F | 40° F | 60° F | 39 | 27 | 12 | .226 |
| 4 | mix (14–34° F) | 80° F | 60° F | 40° F | 50° F | 39 | 27 | 9 | .226 |
| 5(a) | mix (14–39° F) | 80° F | 60° F | 40° F | 60° F | 36 | 27 | 9 | .171 |
| (b) | with 20% Bleed | 80° F | 60° F | 40° F | 60° F | 39 | 27 | 9 | .219 |
| 6(a) | mix (9–34° F) | 80° F | 60° F | 40° F | 60° F | 39 | 29 | 10 | .167 |
| (b) | with 20% Bleed | 80° F | 60° F | 40° F | 60° F | 42 | 29 | 13 | .223 |

Note: iC₄ = isobutane

Further comments on Table I are as follows:

Examples 3 shows that under the same conditions as in Example 1 (80° inlet and 60° outlet water in Zone I and 40° inlet and 60° outlet water in Zone II) but using a working fluid having more than one molecular species useful work can be derived, whereas with isobutane none can be derived. Of course useful work can be obtained using isobutane alone as the working fluid if the inlet water in Zone I is at a higher temperature or the inlet water in Zone II is at a lower temperature. Also, as shown by Example 2, useful work can be obtained if the cold water (CW) in Zone II is heated to 50° F. As described in my copending application Ser. No. 480,963 working fluids consisting of a single molecular species and/or concurrent flow of the different liquid phases are quite practicable. However, Table I illustrates the advantage of a multiple species (two or more) working fluid and of counter current flow of the different phases. The KWHr figures in the last column of Table I assume there is no heat transfer loss. There are, of course, heat transfer losses but these are very small.

Example 4, which is the same as Example 3, except that the water in Zone II is heated from 40° to 50° rather than from 40° to 60° shows that useful work can be accomplished but requires the pumping of twice as much cold water in Zone II as is required in Example 3.

Examples 5(a) and 5(b) have the following significance. Comparing Examples 5(a) with Example 3, it will be seen that the presence under the same conditions of water inlet and outlet temperatures in Zones I and II, the presence of a high boiling fraction in the working fluid substantially diminishes the theoretical work but if, as in Example 5(b) a portion of the working fluid is bled off and returned to Zone II as described, there is very little reduction of work and there is the advantage of greater control over the flow of liquid working fluid (LWF) through Zone I countercurrently to the heating water (HW).

Example 6(a) and 6(b) illustrate the point that with a working fluid having a lower boiling fraction and with the same bleed features [Example 6(b)] achieves the same result as in Example 5(b), that is, substantially the same work as in Example 4 with the added advantage of flow control.

Of course, where prevailing conditions differ, e.g. when hotter or cooler warm water (HW) and/or cooler or warmer cold water (CW) are available for Zones I and II, respectively, the results will differ from those in Table I, but Table I illustrates principles of general applicability such as the advantage of matching temperature changes in Zones I and II (compare Examples 3 and 4) and the use of excess working fluid (i.e. more liquid working fluid circulating through Zone I than is vaporized) as a control mechanism. The excess liquid working fluid (LWF) caused to flow through Zone I and pumped to Zone II will add a pumping requirement but the energy expended for pumping is slight and is far out weighed by its utility as a control to assure steady flow of liquid working fluid countercurrently to warm or hot water in Zone I.

Referring again to FIG. 2, the flow of fluids (CW), LWF and VWF accompanied by a water vapor component) may be established and may be maintained as follows:

At the start of operation, cold water (CSW) will be caused to flow through Zone II from inlet line 11 to outlet line 42 and the out flow will be regulated to establish a water level such that the lower edges of the baffles 32 dip below the surface of the water and the water flow will be adjusted to maintain that level. The vapor of working fluid (VWF) will be caused to pass into stage 1 of Zone II through pipe 34 and submerged sparger 35. This vapor will bubble up through the water into the vapor space of stage 1 above the water level. Some of the vapor will condense in the water and will float to the top (it being assumed that the liquid working fluid is less dense than water), and to it will be added condensate of vapor formed in the vapor space. The remaining vapor will pass through pipe 34a and the same process will occur in stage 2 and in turn in each of the stages of Zone II. As the depth of the liquid working fluid increases in stage 1, its hydrostatic head will depress the level of water until the lower edge of baffle 32 dips into the liquid working fluid but not into the water. At such time liquid working fluid will flow under the lower edge of baffle 32 into stage 2. This process will continue in each state in turn until a steady state is reached in all of the stages and flow of water (CSW) proceeds normally from left to right and flow of working fluid (vapor and liquid) proceeds normally from right to left with the baffles dipping into the liquid working fluid but not into the water. During start up liquid level gauges of known type together with known sensing and control equipment may be used to adjust the liquid level and maintain it; for example, by increasing or decreasing the flow of water through Zone II and/or increasing or decreasing the input of vapor of working fluid through line 29 and/or removal of liquid working fluid through line 40.

By such means, the fluid flows in Zone II are largely self-regulating. For example, should the water level rise, external liquid level control equipment would function to throttle input of water (CSW) through the line 11 or output (USW) through line 42 to lower the liquid level to the proper condition. Further, in the event that the water level rises above the lower edge of a baffle 32 liquid working fluid (LWF) could no longer flow into the next stage, the thickness and hydrostatic head of the LWF layer would increase and this would depress the water level. If the liquid level should diminish and drop below its normal level, the automatic level control equipment would function to adjust the water input-output and/or the vapor input and/or the LWF output to restore the liquid level to its normal condition.

Further, if desired or required pumps may be used to pump LWF from stage to stage.

The explanation above is applicable to FIG. 3 (described below) and generally to the practice of the present invention.

Figure 3:
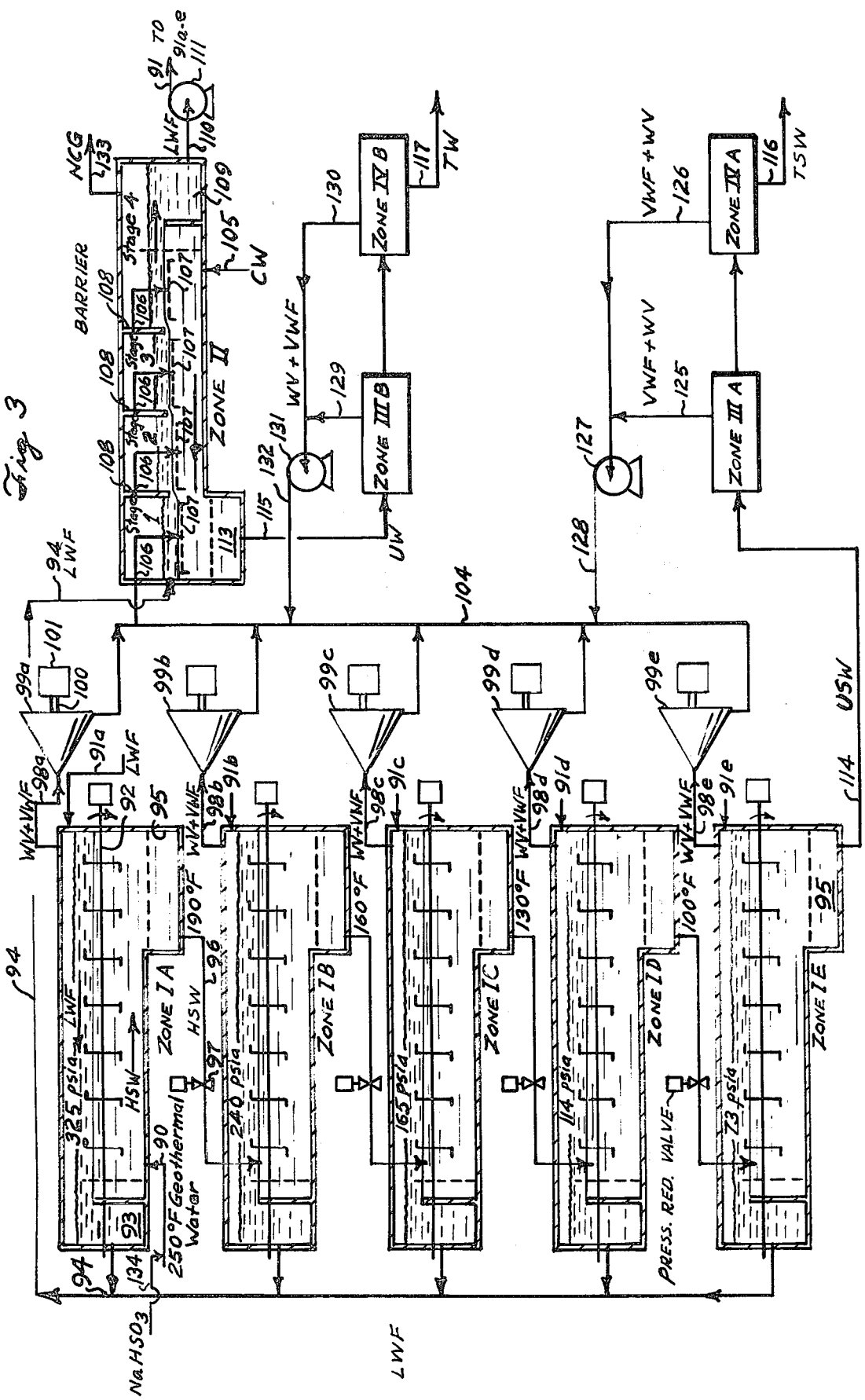
FIG. 3 is a similar diagrammatic view of a system employing a hotter source of water (HW) such as, for example, 250° F. geothermal water as a heat source and employing as the condensing medium water from a cooling tower at 70° F.

Referring now to FIG. 3, Zone I is shown as a five stage zone, the stages being indicated as Zone IA, IB, IC, ID and IE. More or less than five zones or stages may be employed. Zone II is shown as a four stage zone but more or fewer stages may be employed.

Geothermal water at 250° F. enters Zone IA through line 90 and flows through Zone IA from left to right. Liquid working fluid enters Zone IA through line 91a and flows from right to left. Mixing means 92 such as a shaft having paddles and driven by a motor may be used aided if need be (or replaced in toto if feasible) by turbulence caused by introduction of vapor of working fluid below the water level and by turbulence caused by boiling. As in FIG. 2, the contact between liquid working fluid (LWF) and water (HSW) is intimate and direct but not such as to form an emulsion nor to impede steady flow of liquid working fluid countercurrently to the flow of water. A settling basin 93 is provided for separating unevaporated working fluid which is carried off to return line 94 for return to Zone II as described above with reference to FIG. 2 and Examples 5(a) and 6(a). Partially used, warmed water (USW) is separated in settling basin 95 and is passed by line 96 and pressure reduction valve 97 to the left hand end of Zone IB. A portion of the liquid working fluid returning from Zone II enters the right hand end of Zone IB and the process described in connection with Zone IA is repeated but with water at a lower temperature and consequently generating vapor of working fluid (VWF) at a lower pressure. This process is repeated in each of Zones IC, ID and IE. Typical vapor pressures are shown for each of Zones IA, IB, IC, ID and IE.

The effluent vapor of working fluid (VWF) at the respective pressures pass through lines 98a, 98b, etc. to gas turbines 99a, 99b, etc. each coupled by a shaft 100 to an electric generator 101. If desired the lines 98a, etc. may lead to stages of a staged turbine.

Expanded vapor of working fluid (VWF) passes from each turbine to a common line 104 thence to the first stage of Zone II. Cold water, for example from a cooling tower at 70° F. is pumped through line 105 to stage 4 of Zone II. Ducts 106 and spargers 107 (or other suitable vapor-liquid mixing devices) are provided in the stages to cause intimate direct contact of the vapor of the working fluid with the cool water. Barriers 108 separate the vapor phase in the various stages from one another. Resulting condensate (LWF) is withdrawn from a settling basin 109 and is pumped from line 110 by pump 111 through line 91 to a suitable manifold (not shown) to lines 91a, 91b, 91c, 91d and 91e into the Zones IA, IB, IC, ID and IE. Used heated fresh water (UFW) is separated in settling basin 113.

Used cooled water (USW) in the settling basin 95 of Zone IE and used warmed water (UW) in the settling basin 113 of Zone II leave through lines 114 and 115, respectively. These streams of used water may be joined and treated as in FIG. 2. However, it may be desirable to treat these streams separately. For example, the geothermal water used in Zone I may be laden with minerals, and the water used in Zone II may be fresh water which desirably is maintained in its state of freshness. In that case, separate processing of the streams of water will be employed. Thus, used cooled geothermal water leaving Zone IE is treated in Zones IIIA and IVA corresponding to similarly numbered zones in FIG. 2, and the effluent water leaves the system through line 116. Used cooled fresh water leaving settling area 113 of Zone II through line 115 is treated successively in Zones IIIB and IVB corresponding to Zones III and IV, respectively, of FIG. 2 and leaves the system through line 117.

Vapor from Zones IIIA, IVA, IIIB and IVB is handled as shown. That is, vapor from Zone IIIA leaves through line 125 and vapor from Zone IVB leaves through line 126. Pump 127 pumps vapor through line 128 to join vapor in line 104. Vapor from Zones IIIB and IVB leaves through lines 129 and 130 and is pumped by pump 131 through line 132 to line 104.

If desired geothermal water (TSW) leaving Zone IVA through line 116 and fresh water (TW) leaving Zone IVB through line 117 may be re-oxygenated as in Zone V of FIG. 2. Non-condensible gases leave Zone II through line 133.

Inasmuch as geothermal water frequency contains hydrogen sulfide it may be readily and almost quantitatively removed by a simple chemical reaction as follows:

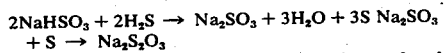

The sodium bisulfite is introduced into the incoming geothermal water by line 134.

In Table 2, there are set forth data on various systems including conventional steam expansion (Example 7); use of isobutane as a working fluid but with indirect heat exchange (Example 8); the use of isobutane as a working fluid but with direct contact heat exchange (Example 9); the use of a working fluid which is a mixture of hydrocarbons that boils at atmospheric pressure at 14° to 44° F, heat exchange being by direct contact (Example 10); and variants of Example 10. In all instances, the source of heat is 1,000 pounds of water at 250° F and the source of cooling water is at 70° F. Column (10) gives the theoretical work that can be obtained from the various systems neglecting inefficiences of the gas turbine, pumping losses and pressure drop. The symbols have the following meanings:

$T_1$ is the water inlet temperature of zone I;
$T_2$ is the water outlet temperature of zone I or of the respective stages of zone I;
$T_3$ is the water inlet temperatures of zone II and
$T_4$ is the water outlet temperature of zone II or of the respective stages of zone II.
$P_1$ is the pressure (psia) of vapor from zone I or the respective stages of zone I.
$P_2$ is the pressure (psia) in zone II, that is, it is the pressure of the expanded vapor from the turbine or turbines.

TABLE 2
THEORETICAL POWER FROM GEOTHERMAL WATER

| (1) Example | (2) Working Fluid | (3) Boiling Range °F at Atm. Pressure | (4) $T_1$°F | (5) $T_2$°F | (6) $T_3$°F | (7) $T_4$°F | (8) $P_1$(PSIA) | (9) $P_2$(PSIA) | (10) KWHr Per 1000 lbs. 250°F Water |
|---|---|---|---|---|---|---|---|---|---|
| 7. | Water Vapor | 212 | 250 | 200 | 70 | 100 | 11.5 | 0.95 | 2.3 |
| 8. | Isobutane | 14 | 250 | 200 | 70 | 100 | 235 | 84 | 1.6 |
| 9. Figure 3 | | | | | | | | | |
| Stage 1 | Isobutane | 14 | 250 | 220 | 70 | 100 | 325 | 74 | 1.2 |
| Stage 2 | " | 14 | 220 | 190 | 70 | 100 | 240 | 74 | 1.1 |
| Stage 3 | " | 14 | 190 | 160 | 70 | 100 | 165 | 74 | .8 |
| Stage 4 | " | 14 | 160 | 130 | 70 | 100 | 114 | 74 | .5 |
| Stage 5 | " | 14 | 130 | 100 | 70 | 100 | 74 | 74 | 0 |
| | | | | | | | | Total | 3.6 |
| 10. Figure 3 | Mixed light hydrocarbons | | | | | | | | |
| Stage 1 | | 14 to 44 | 250 | 220 | 70 | 100 | 325 | 46 | 1.6 |
| Stage 2 | " | 14 to 44 | 220 | 190 | 70 | 100 | 240 | 46 | 1.4 |
| Stage 3 | " | 14 to 44 | 190 | 160 | 70 | 100 | 165 | 46 | 1.2 |
| Stage 4 | " | 14 to 44 | 160 | 130 | 70 | 100 | 114 | 46 | .9 |
| Stage 5 | " | 14 to 44 | 130 | 100 | 70 | 100 | 74 | 46 | .5 |
| | | | | | | | | Total | 5.6 |
| 11. Figure 3, Single Stage | Mixed light hydrocarbons | 14 to 104 | 250 | 160 | 70 | 80–160 | 167 | 46 | 3.3 |
| 12. Figure 3, Single Stage | Mixed light hydrocarbons | 14 to 54 | 250 | 220 | 70 | 100 | 250 | 46 | 1.3 |
| 13. Same as Exh. 12 With 20% Bleed | Mixed light hydrocarbons | 14 to 54 | 250 | 220 | 70 | 100 | 325 | 46 | 1.3 |

In Example 7, water at 250° F is flashed to steam at 200° F and the steam is used to drive a steam turbine. Cooling water at 70° is introduced into a conventional out-of-contact steam condenser (zone II) and is heated from 70° to 100° F. $P_2 - P_1$, which is the driving pressure or pressure drop across the turbine, is 11.5 psia and results in 2.3 KWH of work. The steam, being saturated, contains water droplets when expanded which have an erosive effect on turbine blades. Also, if the water used to produce steam is for example, geothermal water, it may contain corrosive substances (e.g. HCl) and therefore require scrubbing with a chemical agent to remove or neutralize the corrosive solutes.

In Example 8, isobutane is the working fluid and heat exchange is by out-of-contact means. The work accomplished is significantly less than in Example 7 owing to heat exchange loss, which is virtually absent in Example 7. However, because of the higher value of $P_1$, the turbine can be smaller than in Example 7. Low pressure steam as in Example 7 requires the handling of a very large volume of vapor and a very large turbine, which adds greatly to capital expense. Further, the use of isobutane elimintes or greatly reduces erosion and corrosion of the turbine.

On the debit side, however, the system of Example 8 is plagued by scaling of heat exchange surface in zone I if the heating water is geothermal water or any other water containing a considerable quantity of minerals. A way to minimize this problem is to flash the geothermal water at 200° F and use the steam to boil isobutane at 190° F in an out-of-contact heat exchange. Results comparable to those set forth in Example 8 are obtained by this variant.

In Example 9, the advantages of direct contact heat transfer and of staging are evident. The first stage alone accomplishes about 70% of the work of Example 8. The system of Example 8 could be staged but, because of large heat transfer losses, this is not as effective or practical. It can be accomplished only at considerable capital cost and operating difficulty. In Example 9, the total work produced in four stages is more than twice that produced in Example 8 and is much more than that produced in Example 7. The system of Example 9 as described in my copending application, Ser. No. 480,963 is a great improvement, but that of the present invention is an even greater improvement.

Example 10 illustrates the very great benefits of the present invention, which employs the direct contact principle of Example 9 and of my copending application, Ser. No. 480,963 combined with the use of a mixture of molecular species. For example, the first stage alone, by reason of the high vapor pressure in stage 1 of Zone I (325 psia) and the low pressure in Zone II (46 psia) produces as much work as Example 8 and together with stage 2, it produces considerably more work than Example 7. Also, turbine size for the production of a given amount of work is greatly diminished; erosion problems of Example 7 are eliminated or greatly diminished; scrubbing of vapor is unnecessary or is greatly facilitated; and the scaling of heat exchange equipment is eliminated.

Example 11 illustrates why it is disadvantageous to employ a wider boiling range working fluid and a single stage. The working fluid in Example 11 has a boiling range of 90° F. (14 to 104° F.) and is used to cool the 250° F. water entering Zone 1 to 160° F., which is the same degree of cooling as in the first three stages of Example 10. The work potential of 3.3 KWH in Example 11 is less than from the work potential of the first three stages of Example 10, which is 4.2 KWH. Whether the cold water in Zone II is heated to a $T_4$ of 80° F. or 160° F. has no effect on work production, because the pressure in Zone II remains the same, being determined by the condensation pressure of the lowest boiling component in the working fluid, and by the cold water temperature $T_3$. If the system is operated in a matched condition (e.g. the cooling of the warm water in Zone I, the boiling range of the working fluid, and the heating of the cooling water in Zone II are all 90° F.) then the effluent water from both Zone I and Zone II is 160° F., which is a temperature high enough to justify more stages for power recovery. If the system is run unmatched (e.g. if the cooling of the warm water in Zone II is either more or less than 90° F., the boiling range of the working fluid is 90° F. and the heating of the cooling water in Zone II is more or less than 90° F.), there are irreversible thermodynamic losses similar to the staging losses described in connection with FIG. 1.

Example 12 employs a 14° to 54° F. boiling range working fluid, all of which is evaporated in the single stage of Zone I. As will be seen, the presence of higher boiling components of the working fluid (boiling above 44° F.) result in a $P_1$ 250 psia, which is about equal to that in stage 2 of Zone I of Example 10. As a result, substantially less work is produced.

Example 13 is like Example 12, except that insted of vaporizing all of the working fluid in Zone I, 20% is left in liquid state and is pumped to Zone II. This results in a considerably greater vapor pressure in Zone I and at the inlet of the gas turbine but heating requirements for recirculation of excess working fluid are such that no more work is accomplished.

The examples provided in the various figures and in Tables 1 and 2 are, of course, illustrative. If, for example, colder water such as 32° F water, cold brine below 32° F or deep seawater is available the outlet temperature of zone II may be lower and this will make it possible to expand the vapor of working fluid to a lower pressure in the gas turbine or turbines. Among variables are inlet and outlet water temperatures of zone I, inlet and outlet water temperatures in zone II, boiling range and initial and end boiling points of the working fluid and the number of stages.

Among the advantages of the invention are, of course, a greater work output, which is much greater than the work output of the prior art systems of Examples 7 and 8 and is significantly greater than that of Example 9 (which is described in my copending application Ser. No. 480,963); relative freedom from condensation by the expansion in the turbine, which causes erosion and corrosion; freedom from scaling of heat transfer surfaces; the ability to work with low temperature fluids such as waste steam, surface ocean water and geothermal water that is not considered to be hot enough for use in conventional steam electric plants; and the ability to use sources of hot (HW) and cold (CW) sources of water that differ only about 20° F. With a given source of hot water (HW) and a given source of cold water (CW) it is possible to use turbines of lesser size than with conventional systems and/or to extract more heat from a given source and convert it into useful work.

The following criteria and considerations result in maximum power generation from the practice of the present invention.

With a given source of cooling water (CW) for zone II at a given temperature, the less it is heated (i.e., the lower is $T_4$), the more work is accomplished because $P_2$ is lower, hence $P_1 - P_2$ (the driving force) is greater. However, to accomplish a given amount of cooling to a lower $T_4$ requires more cooling water.

Having decided on $T_4$, hence the degree of heating ($T_4 - T_3$) in zone II, the cooling per stage in zone I preferably approximates this degree of heating; that is, $T_1 - T_2$ for each stage of zone I should be approximately equal to $T_4 - T_3$.

Then a working fluid is formulated so that its boiling range is approximately the same as $T_1 - T_2$ and $T_4 - T_3$. It is not possible to achieve exactitude in this regard because the boiling range of a mixture of molecular species, such as a mixture of different hydrocarbons, changes with the pressure. However, it is possible to formulate a satisfactory working fluid having a nearly linear boiling point curve.

Further, as pointed out above, there is an advantage in having a small proportion of high boiling material in the working fluid which boils above the intended maximum temperature at the inlet or hot end of zone I and to remove this as liquid and pump it to zone II. At times, engineering economy or compromises may indicate non-maximum power generation, e.g. fewer stages, fewer turbines, etc. That is to say the scope of the present invention is not limited to matching conditions (boiling range of $WF = T_1 - T_2$ (per stage) $= T_4 - T_3$).

OTHER SOURCES OF HOT AND COLD WATER

Sea water and geothermal water, and water from cooling towers have been mentioned above as sources of hot water, cold water or (in the case of sea water) both hot and cold water. Other sources include deep lakes wherein there is warm surface water and cold deep water; streams of fresh water (as a source of cold water) and solar ponds. An example of the latter is an artificial pond about 1 to 5 meters in depth having an absorbent bottom (e.g. black polyethylene); a dense lower layer of brine and an upper layer of fresh water. Sunlight passes through the upper layer and lower layer with limited absorption of radiant energy; a large proportion of the incident radiation is absorbed by the absorbent bottom; and much of the absorbed energy is transmitted by conduction and convection to the lower brine layer. If such a pond is undisturbed, it will provide a lower layer of water at a temperature of about 100° to 200° F. which is transferred to the quiescent upper layer of fresh water only very slowly. The warm lower layer may be used in Zone I of the process of this invention and of the invention of my copending application Ser. No. 480,963. The upper layer may be cooled by evaporation and drawn off as a source of cold water for Zone II, or a separate source of cold water, e.g. a lake, a stream or underground water pumped to the surface may be used for Zone II.

Bodies of water in the arctic and antarctic may also be used, for example sea water close to the freezing point may be used as the source of heat in Zone I employing a very volatile working fluid such as propane and employing a concentrated brine near its freezing point as the source of cold water in Zone II. In such a case, in Zone I the latent heat of fusion released by the sea water in the course of freezing is added to the sensible heat of the water and will constitute the principal source of heat in Zone I and a nearby brine pond may provide the heat sink.

Figure 4:
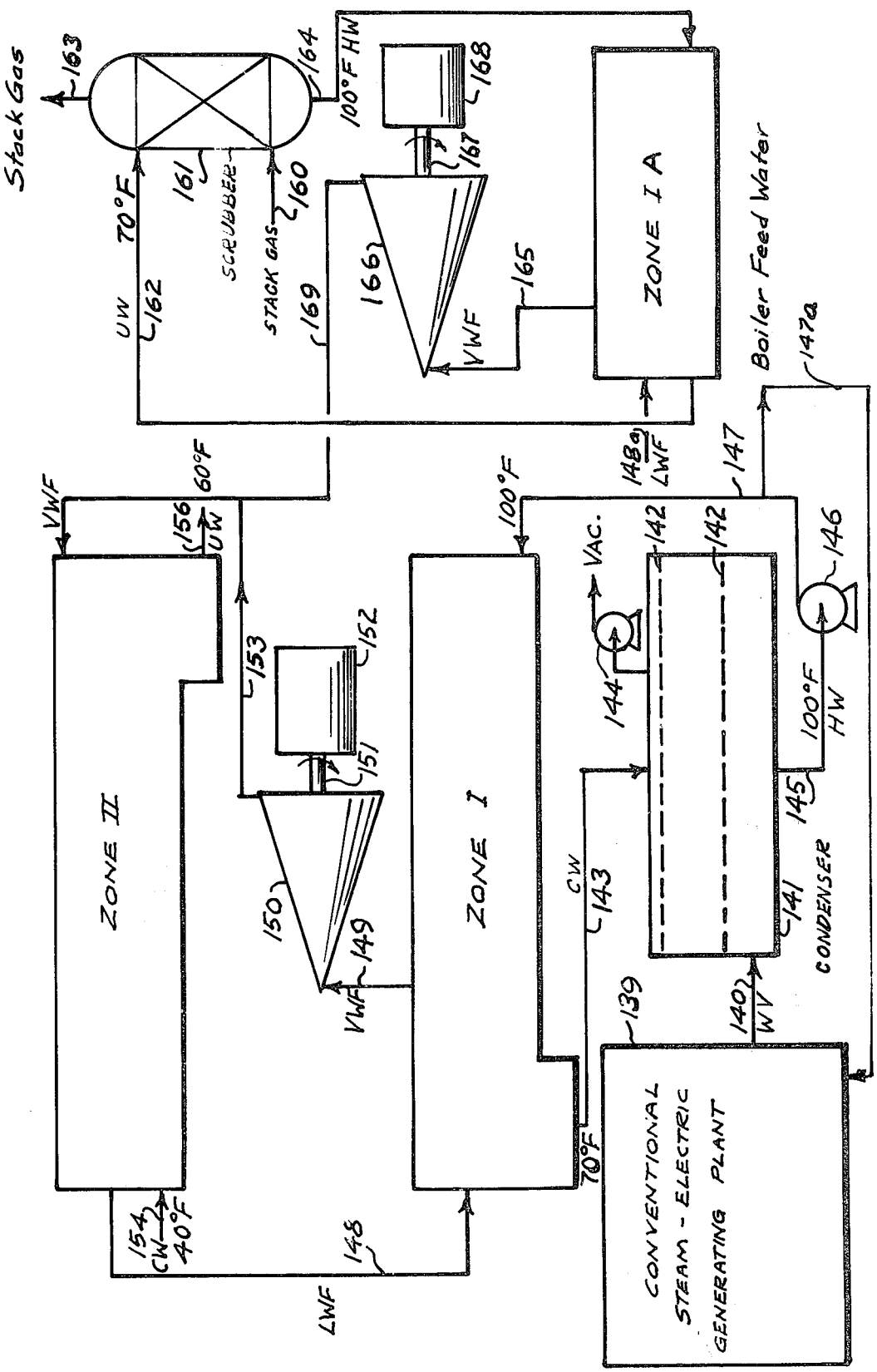
FIG. 4 is a diagrammatic view of a system in accordance with the present invention employing waste steam and stack gases from a steam-electric power plant as sources of heat.

Referring now to FIG. 4, application of the invention to sources of waste heat from a steam electric power plant is illustrated, such waste heat being cooling water from the condenser and scrubbing water used to scrub stack gases.

In steam electric plants (both fossil fuel and nuclear fuel heated plants) steam is generated at pressures ranging from 500 to about 3,500 psia, and is expanded through steam engines, usually axial turbines, in one or more stages with reheat between the stages. Final condensation temperature is usually an engineering compromise between the power generated and cost of the condenser and the cost of the turbine. Turbine cost increases rapidly at low pressures due to the tremendous volumes which have to be handled. Large quantities of heat at temperatures of interest for potential power production by the method of the present invention are rejected to the cooling water from the condensers of fossil fuel and nuclear fuel plants and from the stacks in the case of fossil fuel plants.

In FIG. 4, block 139 represents a steam electric plant the fuel for which may be nuclear fuel or fossil fuel and it includes a boiler and one or more steam turbines. Normally such a plant would include a condenser but is modified as will now be described.

Referring to FIG. 4, Zones I and II may be as in FIG. 2 or FIG. 3. Steam at 100° F. enters through line 140 a condenser 141 having rain decks 142. Water from Zone I that has been used to evaporate liquid working fluid enters condenser 141 through line 143 and passes in finely divided form through rain decks 142 and condenses the steam. Vacuum is maintained in condenser 141 by pump 144. Condensate of steam and condensing water at 100° F. leaves condenser 141 through line 145 and is pumped by pump 146 through line 147 into Zone I. Liquid working fluid enters Zone I through line 148, flows countercurrently to the water in zone I and vaporizes. Vapor of working fluid leaves Zone I through line 149. The working fluid is a mixture of light hydrocarbons having an initial boiling point of 14° F. and a final boiling point of 34° F. Pressure in Zone I is 46 psia. The vapor of working fluid is expanded through gas turbine 150 which is connected by shaft 151 to electric generator 152. Expanded vapor of working fluid passes through line 153 into Zone II and passes (together with its condensate) countercurrently to a flow of cool water introduced at 40° F. through line 154. Warmed cooling water leaves Zone II through line 156. Thus a substantial increase of power is obtained from very low pressure steam which, in the conventional steam electric plant, would be wasted.

An additional increment of power is obtained from the heat of stack gas (if the plant is fueled by fossil fuel) which enters by line 160 a scrubber 161. The scrubber 161 may be of conventional design packed with suitable material to promote gas-liquid contact. Water at 70° F. is introduced into the top of scrubber 161 through line 162 and flows countercurrently to the ascending stack gas which is vented through line 163. Water containing dissolved and entrained contaminants removed from the stack gas and heated to 100° F. leaves scrubber 161 through line 164 and passes into zone IA which may be like Zone I of FIG. 2 or FIG. 3. Liquid working fluid having the same composition as that introduced into Zone I enters Zone IA through line 148a flows countercurrently to the flow of water and is vaporized. This stream of liquid working fluid is shown as a portion of the working fluid circulating through Zones I and II. Vapor of working fluid leaves Zone IA through line 165 and is expanded in gas turbine 166 connected by a shaft 167 to an electric generator 168. Expanded vapor of working fluid leaves turbine 166 through line 169 and joins the vapor in line 153 entering Zone II. Alternatively a separate Zone IIA (not shown) may be used instead of passing vapor into Zone II.

Treatment of water circulating through Zones I and IA and of water leaving Zone II may be carried out as described above in connection with FIGS. 2 and 3; likewise other precautions described above such as bleed lines to avoid unwanted build up of impurities in circulating fluid and exercise of control by the use of higher boiling components of working fluid may be employed.

FIG. 4 is shown as utilizing very low temperature steam. It may also employ higher pressure steam and in the design of new steam electric power plant the present invention and (to less advantage but still with considerable benefit) the invention of may copending application, Ser. No. 480,963 may be employed to utilize steam at considerably higher pressures, e.g. 1 to 10 psia, thereby diminishing the size and cost of low pressure turbines and recovering more economically the power lost by such turbine design plus, of course, the power recovered from steam that would be wasted by a conventional design. That is to say, by employing the principles of direct intimate contact of an immiscible working fluid with hot water for vaporization and with cold water for condensation, a very substantial saving in steam electric power plant design plus an added energy recovery are made possible.

APPLICATION OF THE INVENTION TO HEAT PUMPS

The principles of the present invention are applicable to heat transfer in heat pumps. This is illustrated generally in FIG. 5.

Figure 5:
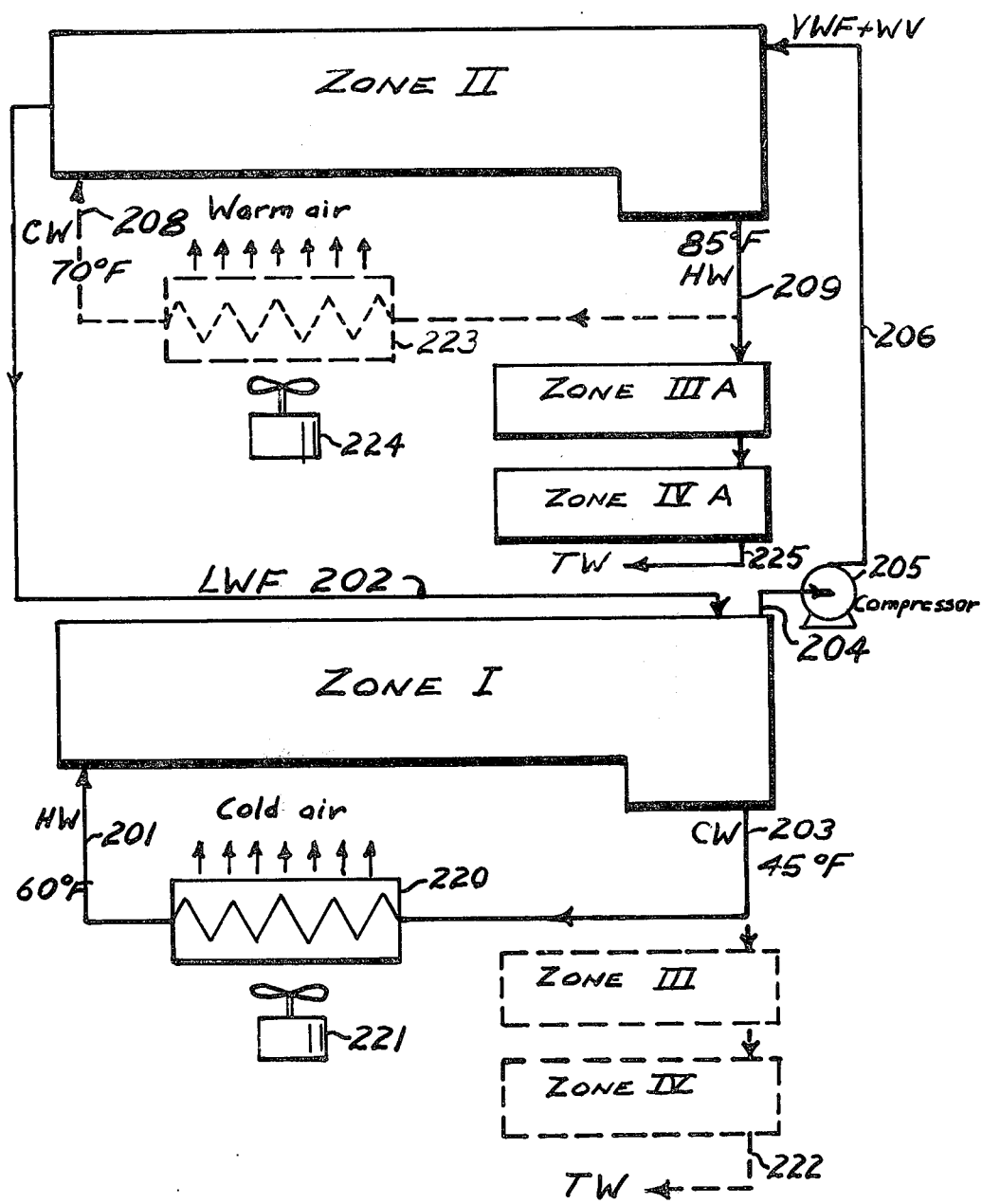
FIG. 5 is a diagrammatic view showing application of the invention to a heat pump.

Referring to FIG. 5, Zones I and II function, as in the preceding figures, as a zone for vaporizing liquid working fluid and a zone for condensing vapor of working fluid, respectively. In Zone I, direct contact of working fluid with a liquid aqueous phase, e.g. a brine to be refrigerated for use in cooling coils, is employed. The working fluid may be a mono-molecular species but preferably it is a mixture of two or more molecular species. The flow of fluids in Zones I and II may be con-current but preferably it is countercurrent.

In a specific example shown in FIG. 5, brine enters Zone I through line 201 at 60° and liquid working fluid enters through line 202. Contact between the working fluid and the brine is intimate direct contact brought about by mixing devices (not shown) and/or the input of vapor of working fluid below the interface of the water and liquid working fluid.

The brine is cooled in Zone I, for example to 45° F. and may be then used as a refrigerant or coolant by passing it from line 203 through cooling coils 220, thence back to Zone I through line 201. A fan 221 is shown. The air blown over the coils by the fan is cooled and may be used as a coolant. If the cooled water is discarded, in toto, or in part to prevent build-up of dissolved working fluid (WF), it may first be treated as in FIGS. 2 and 3 above to rid it of entrained and dissolved working fluid as in Zones III and IV in FIG. 5. The treated aqueous liquid (TW) is removed from the system through line 222.

Vapor of working fluid (VWF) together with water vapor (WV) leaves Zone I through line 204 and is compressed by compressor 205 and introduced into Zone II through line 206. Water, for example at 70° F., is introduced into Zone II through line 208. If the working fluid is a mixture of molecular species, Zone II will preferably be divided into stages by baffles and flow of water will preferably be countercurrent to flow of working fluid. Water is warmed in Zone II, for example to 85° F. and condensed working fluid (LWF) leaves through line 202 to be recycled to Zone I. Water (HW) leaving Zone II through line 209 may be used for heating purposes. For example it may be passed through coils 223 over which air is blown by a fan 224 and the heated air may be used for space heating, or the coils may be embodied in the circulation system of a swimming pool (not shown) to heat the water in the pool. The water is returned to Zone II through line 208. All or part of the water may be treated in Zones IIIA and IVA as described above to rid it of dissolved and entrained working fluid and the treated water (TW) is removed from the system through line 225.

Zones I and II may be designed as in FIG. 2 or FIG. 3. The working fluid is a mixture of molecular species. The flow of the working fluid and water in Zones I and II is countercurrent.

In the application of the present invention as described in connection with FIGS. 2, 3 and 4, the purpose of vaporizing and condensing working fluid is to produce mechanical energy. In the application of the principle of direct intimate contact of working fluid and water as described above with reference to FIG. 5, the object is to transfer heat. There is an energy input to the system of FIG. 5 by the compressor 205, which is converted to thermal energy by compression of the vapor of working fluid, as in all heat pumps. Application of the principles of the present invention to heat pumps as described above results in a substantial reduction in power requirement. Thus, heat transfer losses are sharply reduced and if the working fluid is a variable boiling (two or more molecular species) fluid and if countercurrent flow in Zones I and II is employed, staging losses are also sharply reduced.

It will therefore be apparent that novel and useful methods and apparatus for production of energy and transfer of heat have been provided.

I claim:

1. A method of deriving mechanical energy from a source of relatively hot or warm water (HW) and a source of relatively cold or cool water (CW) wherein a working fluid (WF) is vaporized from the liquid state (LWF) to the vapor state (VWF) by heat from the hot or warm water source (HW), the vapor (VWF) is expanded through a combustionless gas pressure to mechanical energy converter, the expanded vapor (VWF) of working fluid (WF) is condensed by the source of cold or cool water (CW) and the condensate (LWF) is recycled, said working fluid (WF) being immiscible with water, being more volatile than water, and having a density different from that of water to allow its separation from water by gravity, such method comprising:
   a. providing a first zone (LWF heating Zone I) having a warm water inlet and a relatively cool water outlet, such zone being adapted to cause intimate direct contact of liquid working fluid (LWF) with water (HW) to vaporize said liquid working fluid at least in part,
   b. providing a second zone (VWF condensing zone II), having a cold water inlet and a relatively warmer water outlet, such zone being adapted to cause intimate direct contact of both vapor of working fluid (VWF) and condensate thereof (LWF) with water (CW),
   c. causing flow of relatively hot or warm water (HW) through Zone I from its water inlet to its water outlet,
   d. causing flow of relatively cold or cool water (CW) through Zone II from its water inlet to its water outlet,
   e. providing said working fluid (WF) in the form of a mixture of two or more molecular species and having a boiling range,
   f. causing such working fluid in liquid state (LWF) arriving from Zone II to pass through Zone I countercurrently to the flow of water (HW) and in intimate direct contact with the water to vaporize the liquid working fluid,
   g. causing the vapor of working fluid (VWF) generated in step (f) to expand through a combustionless gas pressure to mechanical energy converter thereby producing mechanical energy,
   h. causing the expanded vapor (VWF) from step (g) to pass into Zone II and to flow, together with its condensate (LWF), through Zone II countercurrently to the flow of water (CW) therein and in intimate direct contact with said water, thereby condensing the vapor of working fluid (VWF) to liquid working fluid (LWF), and
   i. separating the liquid working fluid (LWF) produced in step (h) and returning it to Zone I.

2. The method of claim 1 wherein the liquid working fluid (LWF) is less dense than water.

3. The method of claim 1 wherein the hot water (HW) source is geothermal water.

4. The method of claim 1 wherein the warm water (HW) source is surface seawater and the cold water (CW) source is deep seawater.

5. The method of claim 1 wherein the warm water (HW) source is a solar pond.

6. The method of claim 1 wherein the warm water (HW) source is seawater close to its freezing point and the cold water (CW) source is a brine solution below the freezing point of the seawater.

7. The method of claim 1 wherein the effluent water from the water outlet of at least one of Zones I and II is treated to remove entrained and dissolved working fluid and is thereafter removed from the system.

8. The method of claim 7 wherein said treatment of effluent water is carried out in a first step by pressure reduction to vaporize working fluid and in a second step wherein the water from the first step is stripped of residual working fluid by passage of a gas through the water.

9. The method of claim 7 wherein said treatment of effluent water is carried out in a first step by pressure reduction to vaporize working fluid and in a second step wherein the water from the first step is subjected to a vacuum to remove residual working fluid.

10. The method of claim 1 wherein Zone II is divided into $n$ stages with stage 1 at the water outlet end and stage $n$ at the water inlet end of Zone II, the stages being separated one from another inlet to outlet and flow of liquid working fluid (LWF) through the stages countercurrently to the flow of water, the uncondensed vapor of working fluid (VWF) in each stage other than stage $n$ being conducted into the next stage beneath the liquid level in such stage.

11. The method of claim 10 wherein Zone I is divided into $m$ stages or sub-zones including an upstream water inlet stage 1, a downstream water outlet stage $m$ and intervening stages 2 to $m - 1$;
   means including a pressure reducing element connecting each upstream stage for water flow to the next downstream stage, said pressure reducing element serving to reduce the pressure of water to the pressure prevailing in the next downstream stage,
   means within each stage to promote direct intimate contact between liquid working fluid (LWF) and warm or hot water (HW),
   vapor outlet means for conducting vapor of working fluid (VWF) from each stage to a respective gas pressure-to-mechanical energy converter and the spent vapor therefrom to Zone II, and means for conducting liquid working fluid generated in Zone II to each stage of Zone I.

12. A system for producing mechanical energy from a relatively low temperature source of warm or hot water (HW) as a source of thermal energy for evaporation of a liquid working fluid (LWF) to vaporize such liquid and a source of cold or cool water (CW) as a heat sink for condensation of vapor of working fluid (VWF) to liquid working fluid (LWF), said system comprising:
  a. a first zone (Zone I) having a hot water (HW) inlet, a used cooled water (UW) outlet, a vapor outlet for vapor of working fluid (VWF) and a liquid working fluid (LWF) inlet, said inlets and outlets being arranged for countercurrent flow of water and working fluid, said zone being also provided with means to promote intimate direct contact of water (HW) with liquid working fluid (LWF) and vapor thereof (VWF),
  b. a second zone (Zone II) having a cold water (CW) inlet, a warmed used water (UW) outlet, a vapor inlet for vapor of working fluid (VWF) and a liquid working fluid (LWF) outlet, said inlets and outlets being arranged for countercurrent flow of cold or cool water (CW) and working fluid, said Zone II being also provided with means to promote intimate direct contact of the working fluid with the water,
  c. and a gas pressure-to-mechanical energy converter having an inlet connected to the VWF outlet of Zone I and an outlet connected to the VWF inlet of Zone II.

13. The system of claim 12 wherein Zone II is divided into sequential, pressure decreasing stages allowing flow of the liquid phases from stage to stage and means for introducing vapor from each stage to the next lower pressure stage in a manner to promote contact of vapor (VWF) with water (CW).

14. The system of claim 13 wherein Zone I is divided into stages without vapor communication between successive stages, means for transfer of cooled warm water (HW) from each upstream stage to the next downstream stage accompanied by pressure reduction, each stage of Zone I having a vapor (VWF) outlet communicating with a gas pressure-to-mechanical energy converter, the liquid working fluid (LWF) outlet of Zone II leading to each of the stages of Zone I to conduct a fraction of the liquid working fluid (LWF) thereto.

15. In combination with a steam power plant having a boiler and at least one steam turbine operated by high pressure steam generated by the boiler, a waste heat recovery system comprising:
  a. a condenser adapted to condense water or low pressure steam from the turbine or turbines of said plant by direct contact with water, said condenser having a steam inlet for receiving waste or low pressure steam from the turbine or turbines, a return outlet for returning water to the boiler, a cold water inlet and a hot water outlet,
  b. a first zone (zone I) having a hot water (HW) inlet connected to the hot water outlet of said condenser and having a cooled, used water (UW) outlet connected to the cold water inlet of said condenser, said zone I having also a liquid working fluid (LWF) inlet and a vapor of working fluid (VWF) outlet, said zone I being adapted to maintain direct intimate contact between the water flowing therethrough and a liquid working fluid (LWF) which boils below, is immiscible with and has a different density than water to cause vaporization of LWF to VWF,
  c. a combustionless gas pressure-to-mechanical energy converter having an inlet connected to the vapor outlet of zone I and having a vapor outlet,
  d. a second zone (zone II) having a cold water (CW) inlet and a heated, used water (UW) outlet and having also a vapor (VWF) inlet connected to the outlet of said energy converter and having a liquid working fluid (LWF) outlet connected to the liquid working fluid (LWF) inlet of zone I, said zone II being adapted to maintain intimate direct contact between vapor (VWF) and resulting condensate (LWF) of working fluid and the water (CW) flowing therethrough.

16. The system of claim 15, wherein the boiler is heated by combustion of fossil fuel, said system including a stack gas scrubber having a stack gas inlet, a stack gas outlet, a scrubbing water inlet and a scrubbing water outlet for flow of scrubbing water countercurrently to flow of stack gas,
  said system also comprising a zone IA having a hot water (HW) inlet connected to the said scrubbing water outlet and having a cold, used water (UW) outlet connected to said scrubbing water inlet.
  said zone IA having a liquid working fluid (LWF) inlet and a vapor of working fluid (VWF) outlet, said zone IA being adapted to maintain intimate direct contact between liquid working fluid (LWF) and water,
  said system also including a combustionless gas pressure-to-mechanical energy converter having a vapor inlet connected to the vapor outlet of Zone IA and having an expanded vapor outlet connected to Zone II.

17. A method of operating a heat pump system comprising an evaporating-cooling zone (Zone I) for evaporating a liquid working fluid (LWF) and cooling an aqueous liquid (HW) by heat exchange between the fluid LWF and the liquid HW, a compressor for compressing the vapor of working fluid (VWF) generated in Zone I and a condensing-heating zone (Zone II) for condensing compressed vapor of working fluid VWF) from the compressor, said method comprising:
  a. providing said Zone I with a water inlet, a water outlet, a liquid working fluid inlet, a vapor of working fluid outlet and means for causing intimate direct contact between water and liquid working fluid in said Zone I, said inlets and outlets being arranged to cause countercurrent flow of water and liquid working fluid in said Zone I,
  b. providing said Zone II with a water inlet, a water outlet, a vapor of working fluid inlet, a liquid working fluid outlet and means for causing intimate direct contact of vapor of liquid working fluid and water in said Zone II, said inlets and outlets being arranged to cause countercurrnt flow of water and vapor of liquid working fluid in said Zone II,
  c. causing flow of relatively hot or warm water (HW) through Zone I from the water inlet to the water outlet thereof,
  d. causing flow of relatively cold or cool water (CW) through Zone II from the water inlet to the water outlet thereof, e. providing a working fluid (WF) in the form of a mixture of two or more molecular species and having a boiling range, said working fluid being immiscible with water, lower boiling than water and having a density different than that of water to allow separation of the liquid working fluid from water by gravity, f. causing such working fluid in liquid state (LWF) to pass through Zone I from its LWF inlet countercurrently to the flow of water (HW) and in intimate direct contact with the water to vaporize the liquid working fluid and cool the water, and conducting vapor of working fluid (VWF) from Zone I through the VWF outlet to said compressor, g. compressing the vapor of working fluid (VWF) generated in step (f) in said compressor, h. causing the compressed vapor (VWF) from step (g) to pass into Zone II and to flow, together with its condensate (LWF), through Zone II countercurrently to the flow of water (HW) therein and in intimate direct contact with water, thereby condensing the vapor of working fluid (VWF) to liquid working fluid (LWF), i. separating the liquid working fluid (LWF) produced in step (h) and returning it to Zone I and j. the temperature of inlet water to Zone I being lower than the temperature of outlet water from Zone II.

18. The method of claim 17 wherein the liquid working fluid (LWF) is less dense than water.

19. The method of claim 17 wherein the effluent water from at least one of Zones I and II is treated to remove entrained and dissolved working fluid.

20. The method of claim 17 wherein the water (HW) passed through Zone I is a brine and the cooled brine (UW) leaving Zone I is used as a cooling medium.

21. The method of claim 17 wherein the heated water leaving Zone II is used as a heating medium.

22. The method of claim 17 wherein the liquid working fluid (LWF) is more dense than water.

23. The method of claim 22 wherein said working fluid is a mixture of halocarbons.

24. The method of claim 17 wherein Zone II is divided into a stages with stage 1 at the water outlet end and stage $n$ at the water inlet end of Zone II, the stages being separated one from another by means which allow flow of water (CW) through the stages from inlet to outlet and flow of liquid working fluid (LWF) through the stages countercurrently to the flow of water, the uncondensed vapor of working fluid (VWF) in each stage other than stage $n$ being conducted into the next stage beneath the liquid level in such stage.

25. The method of claim 24 wherein Zone I is divided into $m$ stages or sub-zones including an upstream water inlet stage 1, a downstream water outlet stage $m$ and intervening stages 2 to $m-1$;

means including a pressure reducing element connecting each upstream stage with the next downstream stage, said pressure reducing element serving to reduce the pressure of water to the pressure prevailing in the next downstream stage, means within each stage to promote direct intimate contact between liquid working fluid (LWF) and warm or hot water (HW), vapor outlet means for conducting vapor of working fluid (VWF) from each stage to a compressor, and means for conducting liquid working fluid generated in Zone II to each stage of Zone I.

* * * * *

UNITED STATES PATENT OFFICE
CERTIFICATE OF CORRECTION

PATENT NO. : 4,009,082
DATED : February 22, 1977
INVENTOR(S) : CALVIN SCHWARTZ SMITH, JR.

It is certified that error appears in the above-identified patent and that said Letters Patent are hereby corrected as shown below:

```
Column 2, line 44, change "brough" to "brought";
Column 3, line 16, change "C" to "F";
Column 3, line 22, change "removed" to "remove";
Column 3, line 29, change "where" to "whether";
Column 6, line 39, change "combustion" to "combustionless";
Column 9, line 15, change "Examples" to "Example";
Column 9, line 42, change "Examples" to "Example";
Column 10, line 20, after "(CW)" delete the parenthesis;
Column 10, line 29, change "The" to "Then";
Column 10, line 46, change "state" to "stage";
Column 12, lin3 48, change "atmoshperic" to "atmospheric";

Column 20, line 6, change "gas pressure to mechanical" to
"gas-pressure-to-mechanical".
```

Signed and Sealed this

Twenty-first Day of July 1981

[SEAL]

Attest:

Attesting Officer

GERALD J. MOSSINGHOFF

Commissioner of Patents and Trademarks